(12) United States Patent
Kawano et al.

(10) Patent No.: US 8,789,442 B2
(45) Date of Patent: Jul. 29, 2014

(54) ASSEMBLED STRUCTURE OF BRAKE RELEASE KNOB

(75) Inventors: Eiji Kawano, Saitama (JP); Satoru Masuda, Kanagawa (JP)

(73) Assignee: Honda Motor Co., Ltd., Yokohama (JP)

( * ) Notice: Subject to any disclaimer, the term of this patent is extended or adjusted under 35 U.S.C. 154(b) by 81 days.

(21) Appl. No.: 13/560,164

(22) Filed: Jul. 27, 2012

(65) Prior Publication Data

US 2013/0025402 A1 Jan. 31, 2013

(30) Foreign Application Priority Data

Jul. 28, 2011 (JP) ................. 2011-165108

(51) Int. Cl.
*G05G 5/06* (2006.01)
*G05G 1/04* (2006.01)

(52) U.S. Cl.
USPC ............................................. 74/537; 74/523

(58) Field of Classification Search
USPC ............... 74/473.3, 523, 529, 535–538, 553; 16/110.1, 111.1, 405, 421, 422, 426, 16/427, 429, 430; 200/61.28
IPC ...................................... G05G 5/06; B60T 7/10
See application file for complete search history.

(56) References Cited

U.S. PATENT DOCUMENTS

| | | | | |
|---|---|---|---|---|
| 6,976,402 B2 * | 12/2005 | Cho | ................................ | 74/535 |
| 7,140,476 B2 * | 11/2006 | Hilss et al. | ..................... | 188/265 |
| 7,587,960 B2 * | 9/2009 | Tsuzuki et al. | .................. | 74/523 |
| 2010/0242666 A1 * | 9/2010 | Kim | ................................ | 74/535 |
| 2010/0294075 A1 * | 11/2010 | Barcin | ............................ | 74/523 |

FOREIGN PATENT DOCUMENTS

JP 2010-058750 A 3/2010

OTHER PUBLICATIONS

Machine translation of JP 2010058750 A obtained on Sep. 9, 2013.*

* cited by examiner

*Primary Examiner* — Thomas R Hannon
*Assistant Examiner* — Adam D Rogers
(74) *Attorney, Agent, or Firm* — Kubotera & Associates, LLC

(57) ABSTRACT

An assembled structure of brake release knob that assures a predetermined anchoring force, and reliable anchoring with no damage being caused in assembling. A cap (80) is fixed in a brake lever distal end part (11); a brake release knob (20) is inserted into the cap (80); a flange part (23) formed on a leg part (22) extending from a head part (21) of the brake release knob is engaged with an innermost end (85) of the cap; in the brake lever distal end part (11), a distal end part taperedly extending from a shoulder part (72) of a release rod (70) is inserted closer to the center of the cap (80) than the leg part (22) of the brake release knob; and between the shoulder part (72) and the innermost end (85) of the cap, the flange part (23) of the brake release knob is sandwiched under pressure.

2 Claims, 4 Drawing Sheets

US 8,789,442 B2

ASSEMBLED STRUCTURE OF BRAKE RELEASE KNOB

TECHNICAL FIELD

The present invention relates to an assembled structure of a brake release knob in a parking brake in which a brake lever is pivotally movably supported by a base member, the brake lever being pulled up to transmit a force to a braking part through a cable for generating a braking force, and upon the braking state of the brake being canceled, the brake lever being thrown while the brake release knob urged by a release rod disposed in a brake lever distal end part being depressed against an urging force.

BACKGROUND ART

Examples of conventional parking brake of this type include a parking brake as disclosed in Patent Document 1.

With such a lever type of parking brake, a brake release knob for canceling the braking state of the brake is loaded using a corrugated dowel or a claw giving a click feeling which is provided in a distal end part of a release rod made of resin.

CITATION LIST

Patent Literature

Patent Document 1: Japanese Published Patent Application No. 2010-58750

SUMMARY OF INVENTION

Technical Problem

However, with such conventional art, there has been a problem of variations in anchoring allowance for interference fit. Specifically, if the anchoring allowance is small, a predetermined anchoring force may not be obtained, while, if it is large, the knob may be fractured. In addition, there has been a problem that, because a portion where the brake release knob and the release rod engage with each other is located inside, it is difficult to check to make sure that the brake release knob has been positively loaded to the release rod, resulting in impossibility of having freedom from occurrence of incomplete anchoring.

The present invention has been made in view of such problems presented by the conventional art, and it is the purpose of the present invention to provide an assembled structure of a brake release knob with which the brake release knob is assembled to the release rod with a clearance fit for loading, whereby a predetermined anchoring force can be positively obtained with the brake release knob being positively anchored with no damage being caused in assembling.

Solution to Problem

The subject matters of the present invention to achieve the above purpose are disclosed in the following respective aspects of the present invention:

[1] An assembled structure of a brake release knob (20) in a parking brake (1) in which a brake lever (10) is pivotally movably supported by a base member (2), the brake lever (10) being pulled up to transmit a force to a braking part through a cable for generating a braking force, and upon the braking state of the brake being canceled, the brake lever (10) being thrown while the brake release knob (20) urged by a release rod (70) disposed in a brake lever distal end part (11) being depressed against an urging force, the assembled structure of the brake release knob (20) comprising:

a cap (80) fixed in the brake lever distal end part (11), and formed so as to allow the brake release knob (20) to be inserted, the brake release knob (20) being comprised of a head part (21) and a leg part (22) extending from the head part (21), the leg part (22) having a flange part (23) engaged with the innermost end (85) of the cap (80) upon the leg part (22) being inserted into the cap (80), a distal end part (73) taperedly extending from a shoulder part (72) of the release rod (70) being inserted closer to the center of the cap (80) than the leg part (22) of the brake release knob (20), and the flange part (73) of the brake release knob (20) being sandwiched between the shoulder part (72) and the innermost end (85) of the cap (80) under pressure.

[2] The assembled structure of a brake release knob (20) set forth in item [1], wherein the cap (80) has a fixing claw (81) which is formed in the shape of a claw by giving a cut in the peripheral wall, the fixing claw (81) having a protrusion part (82) protruded toward the inner peripheral wall of the brake lever (10), the brake lever (10) having an engaging part (13) provided by forming a recess or hole in both side walls for allowing the protrusion part (82) of the cap (80) to be engaged therewith for fixing the cap (80).

[3] The assembled structure of a brake release knob (20) set forth in item [1] or [2], wherein the flange part (23) of the brake release knob (20) is protruded larger than the width of the clearance between the leg part (22) inserted into the cap (80) and the inner wall of the cap (80).

The present invention as described above functions as follows.

The leg part (22) of the brake release knob (20) is first inserted into the cap (80) to engage the flange part (23) of the leg part (22) with the innermost end (85) of the cap (80). The flange part (23) is protruded larger than the width of the clearance between the leg part (22) inserted into the cap (80) and the inner wall of the cap (80). Accordingly, while the brake release knob (20) is being inserted into the cap (80), the flange part (23) is subjected to a force toward the center of the cap (80) by the inner wall of the cap (80). When the brake release knob (20) is further inserted, and the flange part (23) gets out of the innermost end (85) of the cap (80), the force which has been applied to the flange part (23) by the inner wall of the cap (80) is cancelled, thereby the leg part (22) being returned to the original state in which it freely extends, with the flange part (23) being engaged with the innermost end (85) of the cap (80). Thus, by simply inserting the brake release knob (20) into the cap (80), the brake release knob (20) can be assembled to the cap (80).

Next, the cap (80) is inserted into the brake lever distal end part (11) loaded with the release rod (70) to be assembled thereto. When the cap (80) is continued to be inserted into the brake lever distal end part (11), the protrusion part (82) of the fixing claw (81) formed on the side wall of the cap (80) finally engages with the engaging part (13) formed on the inner peripheral wall of the brake lever (10) as a recess or hole, thereby the cap (80) being fixed to the brake lever (10).

When the cap (80) is inserted into the brake lever distal end part (11), the distal end part (73) taperedly extending from the shoulder part (72) of the release rod (70) is inserted into the cap (80) closer to the center thereof than the leg part (22) of the brake release knob (20). The release rod (70) is urged in a direction in which the brake release knob (20) would be forced out from the brake lever distal end part (11).

Therefore, once the cap (80) is fixed in a predetermined location of the brake lever (10), the flange part (23) of the brake release knob (20) that is engaged with the innermost end (85) of the cap (80) is pressed by the shoulder part (72) of the release rod (70). Thereby, when the brake release knob (20) is not pushed into the brake lever (10), the flange part (23) of the brake release knob (20) is always sandwiched between the innermost end (85) of the cap (80) and the shoulder part (72) of the release rod (70).

Advantageous Effects of Invention

In accordance with the assembled structure of the brake release knob of the present invention, the brake release knob is assembled to the release rod with a clearance fit, whereby the brake release knob can be assembled with no damage being caused, and the brake release knob can be positively anchored with a predetermined anchoring force, preventing the brake release knob from dropping out.

DESCRIPTION OF EMBODIMENTS

Hereinbelow, one preferred embodiment of the present invention will be explained with reference to the drawings.

The respective drawings illustrate one embodiment of the present invention.

Figure 1:
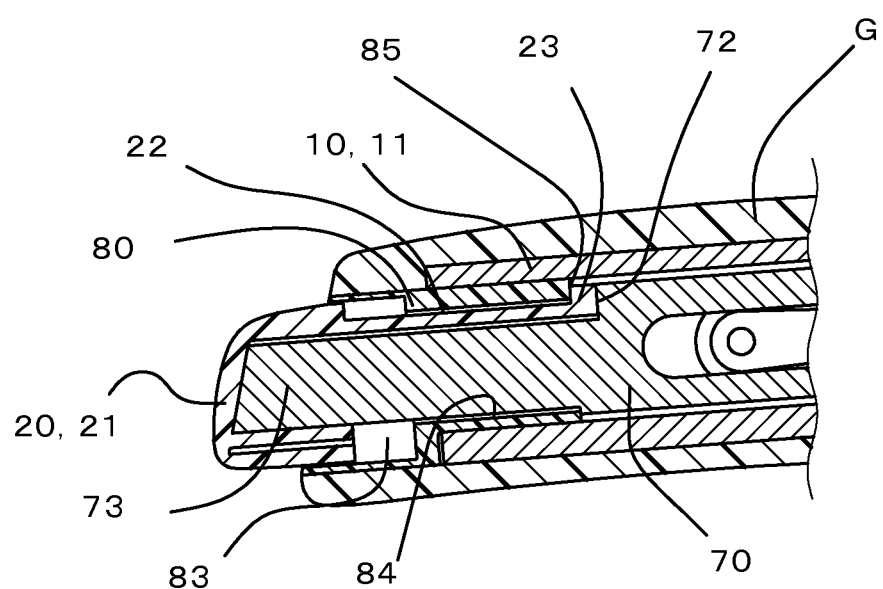
FIG. 1 is a sectional view illustrating an assembled structure of brake release knob in accordance with one embodiment of the present invention.
Figure 2:
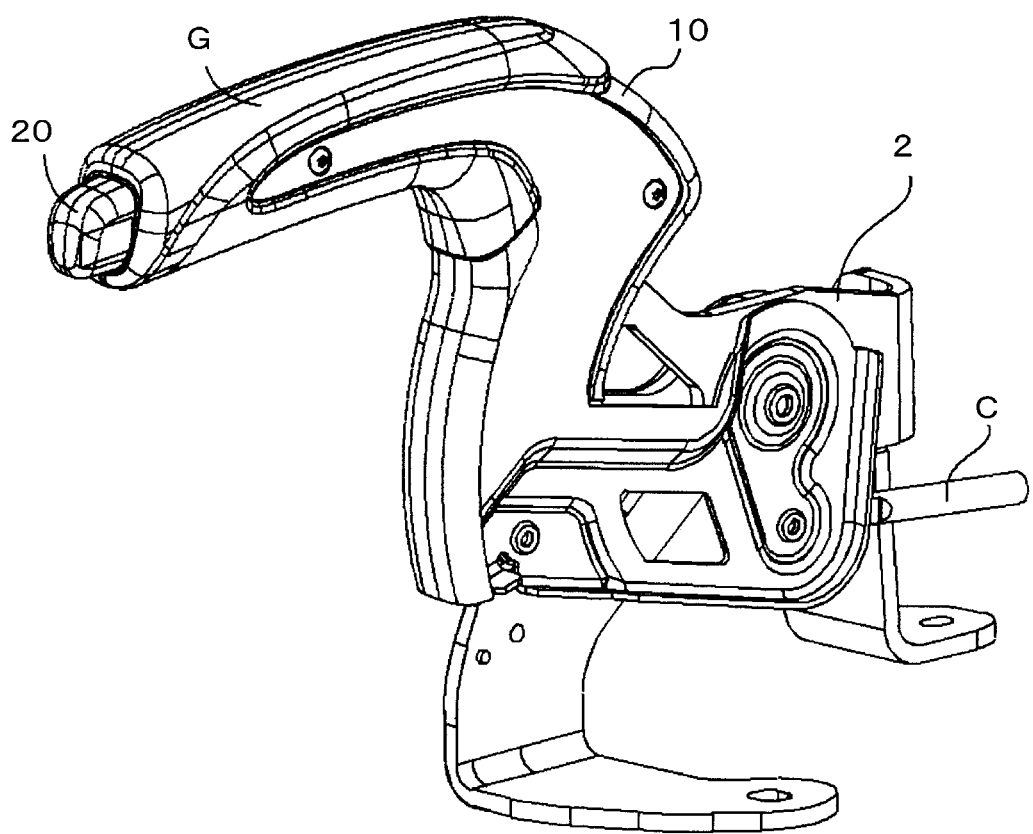
FIG. 2 is a perspective view illustrating a parking brake provided with the assembled structure of brake release knob in accordance with one embodiment of the present invention.
Figure 3:
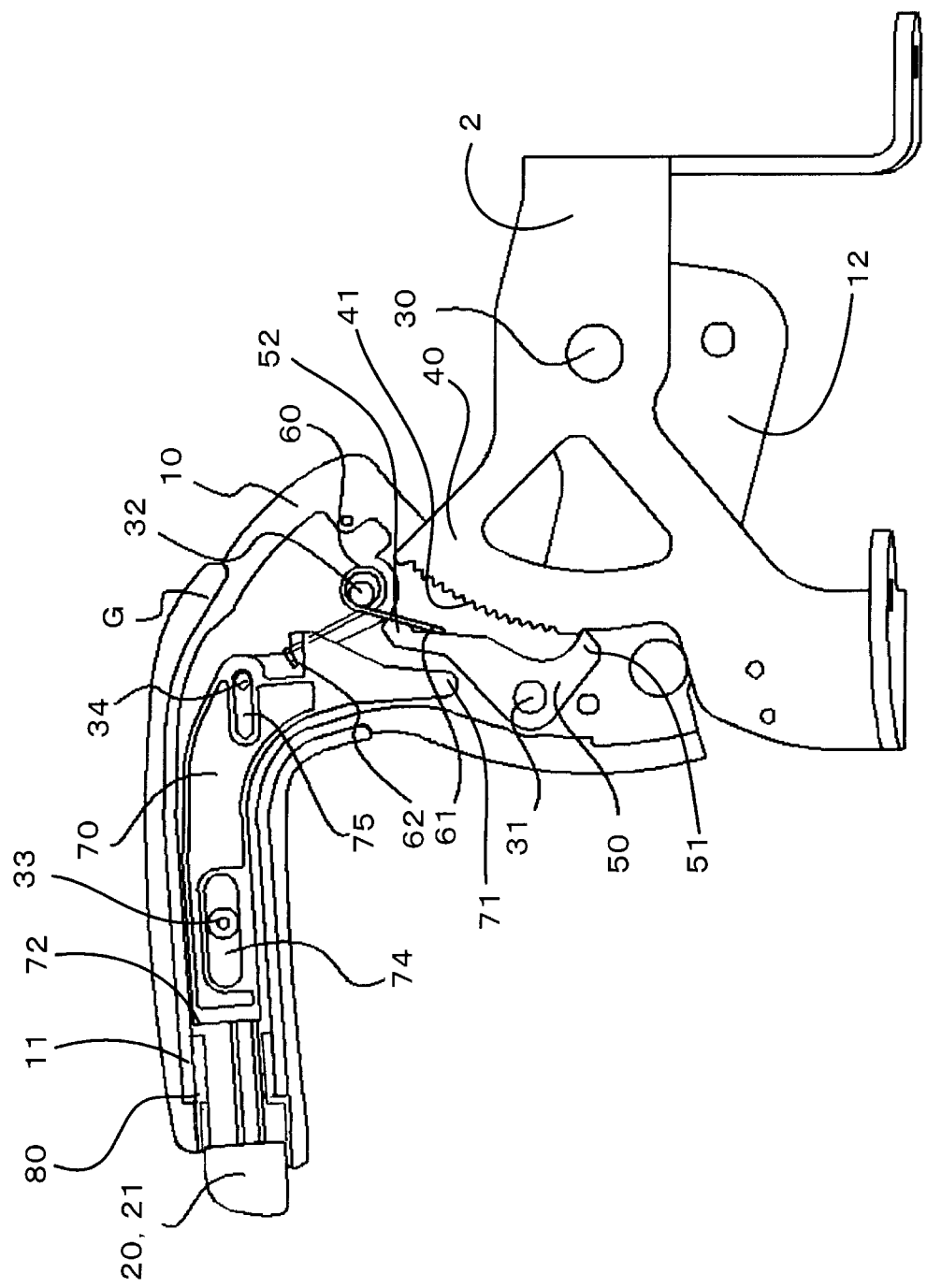
FIG. 3 is an explanatory view illustrating the entire configuration of the parking brake in FIG. 2.

As shown in FIGS. 1 to 3, with a parking brake 1 in accordance with one embodiment of the present invention, a brake lever 10 is pivotally movably supported by a base member 2 fixed to the body of a vehicle, and by pulling up the brake lever 10 by hand, a force is transmitted to a braking part through a cable (C) for generating a braking force; on the other hand, when the braking state of the brake is to be canceled, a brake release knob 20 disposed in a brake lever distal end part 11 is depressed into the brake lever 10, while the brake lever 10 being thrown. A portion of the brake lever 10 that is to be gripped by hand in operation is covered with a grip G for increasing the sense of use in service.

A basal end part 12 of the brake lever 10 that is on the side opposite to the brake lever distal end part 11 is movably mounted to the base member 2 by a pivotally supporting shaft 30. On the base member 2, a ratchet 40 is integrally formed.

A pawl member 50 which is engageable with a tooth 41 of this ratchet 40 is rockably mounted to the brake lever 10 by means of the pivotally supporting shaft 31.

The pawl member 50 is bent in the place of the pivotally supporting shaft 31. At an end part of one arm of the pawl member 50, a claw 51 which is engaged and disengaged with/from the tooth 41 of the ratchet 40 is formed. At an end part of the other arm of the pawl member 50, a hook receiving part 52 with which a hook 61 of a torsion coil spring 60 is engaged is formed. The hook 61 is a portion of the torsion coil spring 60 that is formed by bending an end part of one leg extending from the coiled portion thereof. The direction in which the pawl member 50 is urged by the torsion coil spring 60 is the direction in which the claw 51 is engaged with the tooth 41 of the ratchet 40.

The torsion coil spring 60 which urges this pawl member 50 is loaded on the brake lever 10. To the brake lever 10, a pin 32 is mounted, and on this pin 32, the coil portion of the torsion coil spring 60 is loaded.

The hook 62 which is formed at an end part of the other leg extending from the coil portion is engaged with a basal end part of a release rod 70. Thereby, the release rod 70 is urged in a direction in which the brake release knob 20 is forced out from the brake lever distal end part 11 of the brake lever 10.

In the basal end part of the release rod 70, a pawl releasing part 71 is formed which, when an operation of canceling the braking state of the brake is performed, pushes the pawl member 50 in a direction in which the claw 51 of the pawl member 50 that is seized by the tooth 41 of the ratchet 40 is released from the tooth 41. In the braking state of the brake, the pawl member 50 is urged by the torsion coil spring 60 in a direction in which it is engaged with the ratchet 40, however, when an operation of canceling the braking state is performed, the pawl releasing part 71 releases the pawl member 50 from the ratchet 40 against the urging force of the torsion coil spring 60, whereby throwing the brake lever 10 in this state allows the braking state of the brake to be canceled.

On the side opposite to the basal end part of the release rod 70, a shoulder part 72 is formed, and ahead of the shoulder part 72, a distal end part 73 which is tapered extends. In the middle of this distal end part 73 and the basal end part, a guide hole 74, 75 for guiding the operation of the release rod 70 is formed. The guide hole 74, 75 is an elongated hole which extends along a direction in which the release rod 70 extends, and in the guide hole 74 closer to the distal end part 73, a guide shaft 33 provided for the brake lever 10 is inserted. Likewise, in the guide hole 75 closer to the basal end part, a guide shaft 34 provided for the brake lever 10 is inserted. Thereby, the release rod 70 can be smoothly and positively reciprocated in a direction along which the guide hole 74, 75 extends.

Into the brake lever distal end part 11, a cap 80 is inserted. This cap 80 is formed hollow to allow the brake release knob 20 to be inserted therein, and is assembled to the brake lever distal end part 11, being loaded with the brake release knob 20. The cap 80 has a fixing claw 81 which is formed in the shape of a claw by giving a cut in the peripheral wall. The fixing claw 81 has a protrusion part 82 which is protruded toward the inner peripheral wall of the brake lever 10.

In the cap 80, there is formed a knob accommodating part 83 which accommodates a later described head part 21 of the brake release knob 20 and into which the distal end part 73 of the release rod 70 is inserted, and a leg part accommodating part 84 into which a leg part 22 extending from the head part 21 and the distal end part 73 of the release rod 70 are inserted. The cross-sectional area of the leg part accommodating part is smaller than the cross-sectional area of the knob accommodating part 83, whereby the head part 21 of the brake release knob 20 will not be depressed to within the leg part accommodating part 84. Thereby, the knob accommodating part 83 serves to limit the amount of depression of the brake release knob 20 to a predetermined amount.

The brake lever distal end part 11 of the brake lever 10 has an engaging part 13 which is provided by forming a recess or hole in both side walls. This engaging part 13 is engaged with a protrusion part 82 of the cap 80 when the cap 80 is inserted, thereby allowing the cap 80 to be fixed.

The brake release knob 20 is comprised of the head part 21 and the leg part 22 extending from the head part 21, as described above. The leg part 22 is formed such that it extends, riding the distal end part 73 of the release rod 70, when the cap 80 is inserted into the brake lever distal end part 11 of the brake lever 10, with the brake release knob 20 being assembled to the cap 80. In addition, the leg part 22 has a flange part 23 which, when the leg part 22 is inserted into the cap 80, is engaged with an innermost end 85 of the cap 80, which is an end part of the leg part accommodating part 84.

This flange part 23 is protruded toward the outside from the distal end part of the leg part 22 such that it is engaged with the innermost end 85 of the cap 80 when the brake release knob 20 is assembled to the cap 80. In the state in which the brake release knob 20 is loaded in the cap 80, a small clearance is produced between the inner wall of the cap 80 and the brake release knob 20 so as to allow the brake release knob 20 to be moved inward and outward. The flange part 23 is protruded larger than this clearance width, however, the amount of protrusion not exceeding the clearance width plus the thickness of the peripheral wall of the leg part accommodating part 84 of the cap 80.

In the state in which the cap 80 loaded with the brake release knob 20 is loaded to the brake lever 10, the release rod 70 extends into the head part 21, the distal end part 73 being inserted into the cap 80 closer to the center thereof than the leg part 22 of the brake release knob 20. In other words, the leg part 22 of the brake release knob 20 is interposed between the distal end part 73 of the release rod 70 and the inner wall of the leg part accommodating part 84 of the cap 80.

The flange part 23 of the leg part 22 is interposed between the shoulder part 72 of the release rod 70 and the innermost end 85 of the cap 80. The release rod 70 is urged by the torsion coil spring 60 in a direction in which the distal end part 73 would force out the leg part 22 of the brake release knob 20 from the brake lever distal end part 11 of the brake lever 10, thereby the flange part 23 being sandwiched between the shoulder part 72 of the release rod 70 and the innermost end 85 of the cap 80 under pressure.

Next, the function of the assembled structure of the brake release knob in accordance with the present embodiment will be explained.

FIG. 4 to FIG. 7 illustrate the steps of assembling the brake release knob to the brake lever 10 in the order of drawing number.

Figure 4:
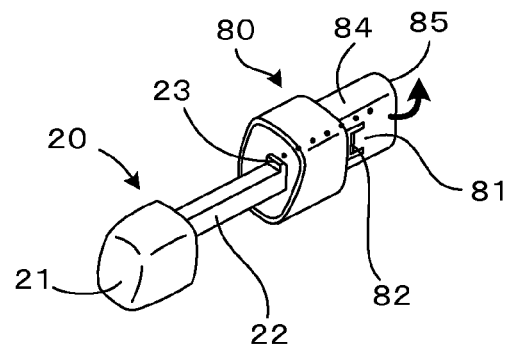
FIG. 4 is a perspective view illustrating assembling of a brake release knob and a cap to each other that constitute the assembled structure of brake release knob in accordance with one embodiment of the present invention.

FIG. 4 illustrate the step of loading the brake release knob 20 in the cap 80. In order to load the brake release knob 20 in the cap 80, the leg part 22 of the brake release knob 20 is first inserted into the cap 80. When the head part 21 starts to get in the knob accommodating part 83 of the cap 80, the leg part 22 is subjected to a force toward the center of the cap 80 from the inner wall of the cap 80, the force being determined by the amount of protrusion of the flange part 23.

Figure 5:
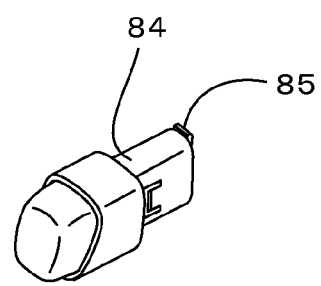
FIG. 5 is a perspective view illustrating the assembled state of the brake release knob and the cap in FIG. 4.

As shown in FIG. 5, when the brake release knob 20 is continued to be inserted, and the flange part 23 finally gets out of the innermost end 85 of the cap 80, coming off from the inner wall of the cap 80, the force which is continued to be applied by the inner wall thereto being cancelled. As a result of this, the leg part 22 is returned to the original state in which it freely extends, with the flange part 23 being engaged with the innermost end 85 of the cap 80. Thus, by simply inserting the brake release knob 20 into the cap 80, the brake release knob 20 can be easily and positively assembled to the cap 80.

Figure 6:
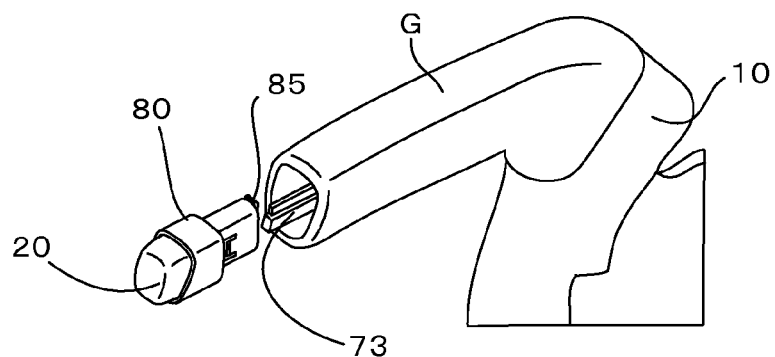
FIG. 6 is a perspective view illustrating the cap to which the brake release knob has been assembled being further assembled to a brake lever.
Figure 7:
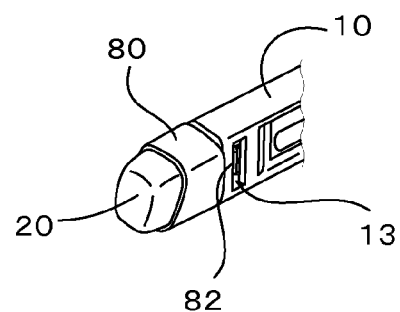
FIG. 7 is a perspective view illustrating the cap to which the brake release knob has been assembled having been assembled to the brake lever.

As shown in FIG. 6, the release rod 70 and the other members are previously mounted to the brake lever 10. Therefore, it is only required to insert the cap 80 loaded with the brake release knob 20 into the brake lever distal end part 11.

When the cap 80 is continued to be pushed into the brake lever distal end part 11, and the protrusion part 82 of the fixing claw 81 formed on the peripheral wall of the cap 80 finally reaches the engaging part 13 formed on the inner peripheral wall of the brake lever 10, the protrusion part 82 is engaged with the engaging part 13. Thereby, the cap 80 loaded with the brake release knob 20 is fixed to the brake lever 10.

When the cap 80 is inserted into the brake lever distal end part 11, the distal end part 73 taperedly extending from the shoulder part 72 of the release rod 70 is passed through the center of the cap 80. The release rod 70 is urged by the torsion coil spring 60 in a direction in which the brake release knob 20 would be forced out from the brake lever distal end part 11.

Therefore, the flange part 23 of the brake release knob 20 that is engaged with the innermost end 85 of the cap 80 is pressed by the shoulder part 72 of the release rod 70. Thereby, when the brake release knob 20 is not pushed into the brake lever 10, the flange part 23 of the brake release knob 20 is always sandwiched between the innermost end 85 of the cap 80 and the shoulder part 72 of the release rod 70.

In addition, when the brake release knob 20 is pushed into the brake lever 10, the flange part 23 is released from the innermost end 85 of the cap 80, however, the distal end part 73 of the release rod 70 extends, being located closer to the center of the cap 80 than the leg part 22, the leg part 22 will not practically be deflected toward the center of the cap 80. Therefore, there will occur no such a trouble as that, when the brake release knob 20 which has been pushed in is returned, the flange part 23 gets into the clearance between the distal end part 73 of the release rod 70 and the cap 80, resulting in the brake release knob 20 dropping out from the cap 80.

Having the assembled structure as described above, the brake release knob 20 can positively provide a predetermined anchoring force, and can be reliably loaded with no damage being caused in assembling.

Heretofore, the embodiment of the present invention have been explained with reference to the drawings, however, the specific configuration is not limited to that of the above-described embodiment, and various changes and modifications may be included in the present invention, so long as they do depart from the spirit and scope thereof. For example, in the present embodiment, explanation has been made on the assumption that the leg part 22 is engaged with the upper edge of the innermost end 85 of the cap 80, however, the leg part 22 may be engaged with the lower edge of the innermost end 85. Further, separate leg parts 22 may be engaged with the upper edge and the lower edge of the innermost end 85, respectively.

Further, the leg part 22 may also be engaged with the right or left side edge of the innermost end 85. In this case, the side face of the release rod 70 may be provided with a portion which is butted and pressed against the flange part 23 engaged with the side edge of the innermost end 85.

INDUSTRIAL APPLICABILITY

The concept of the assembled structure of the brake release knob in accordance with the present invention is generally and widely applicable to levers which are loaded with a knob involved in operation of the lever, the knob being subjected to an urging force in a direction reverse to that of operation of the knob.

The invention claimed is:

1. An assembled structure of a brake release knob in a parking brake in which a brake lever is pivotally movably supported by a base member, the brake lever being pulled up to transmit a force to a braking part through a cable for generating a braking force, and upon the braking state of the brake being canceled, said brake lever being thrown while the brake release knob urged by a release rod disposed in a brake lever distal end part being depressed against an urging force, the assembled structure of the brake release knob comprising:

a cap fixed in said brake lever distal end part, and formed so as to allow the brake release knob to be inserted, said brake release knob being comprised of a head part and a leg part extending from the head part, the leg part having a flange part engaged with an innermost end of said cap upon the leg part being inserted into said cap, a distal end part taperedly extending from a shoulder part of said release rod being inserted closer to a center of said cap than the leg part of said brake release knob, and the flange part of said brake release knob being sandwiched between said shoulder part and the innermost end of said cap under pressure, wherein said cap has a fixing claw which is formed by giving a cut in a peripheral wall, the fixing claw having a protrusion part protruded toward an inner peripheral wall of said brake lever, and said brake lever has an engaging part provided by forming a recess or hole in both side walls for allowing the protrusion part of said cap to be engaged therewith for fixing said cap.

2. The assembled structure of a brake release knob of claim 1, wherein the flange part of said brake release knob is protruded larger than a width of a clearance between said leg part inserted into said cap and an inner wall of said cap.

* * * * *